(12) United States Patent
Choi et al.

(10) Patent No.: US 9,376,148 B2
(45) Date of Patent: Jun. 28, 2016

(54) CATERPILLAR FOR CABLE MOBILE ROBOT AND CABLE MOBILE ROBOT USING THE SAME

(71) Applicant: Research & Business Foundation SUNGKYUNKWAN UNIVERSITY, Suwon-si (KR)

(72) Inventors: Hyouk Ryeol Choi, Gunpo-si (KR); Kyeong Ho Cho, Suwon-si (KR); Young Hoon Jin, Ansan-si (KR); Homoon Kim, Bucheon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 89 days.

(21) Appl. No.: 14/302,910

(22) Filed: Jun. 12, 2014

(65) Prior Publication Data

US 2015/0360736 A1    Dec. 17, 2015

(51) Int. Cl.
*B61B 7/02* (2006.01)
*B61B 9/00* (2006.01)
*B62D 55/06* (2006.01)
*B62D 55/104* (2006.01)
*B62D 55/14* (2006.01)
*B62D 55/30* (2006.01)

(52) U.S. Cl.
CPC .............. *B62D 55/06* (2013.01); *B62D 55/104* (2013.01); *B62D 55/14* (2013.01); *B62D 55/30* (2013.01); *Y10S 901/01* (2013.01)

(58) Field of Classification Search
CPC ............ B61B 7/00; B61B 7/06; B61B 12/00; B61B 12/007; B61B 12/12; B61B 12/122; B61B 12/125
USPC .............. 104/112, 117, 165, 173.1, 178, 197, 104/202, 226
See application file for complete search history.

(56) References Cited

FOREIGN PATENT DOCUMENTS

| JP | 07-071792 B2 | 3/1995 | |
|---|---|---|---|
| KR | 10-0806366 B1 | 2/2008 | |
| KR | 10-0871447 B1 | 11/2008 | |
| KR | 10-1170020 | * 7/2012 | ................. B25J 5/00 |
| KR | 10-1170020 B1 | 7/2012 | |

OTHER PUBLICATIONS

Kim, Ho Moon, et al. "Development of a Climbing Robot for Inspection of Bridge Cable" *Journal of Korea Robotics Society* (2012): 83-91.

* cited by examiner

*Primary Examiner* — R. J. McCarry, Jr.

(57) ABSTRACT

Provided herein is a caterpillar for cable mobile robot and a cable mobile robot using the same, the caterpillar for cable mobile robot and cable mobile robot including a case; a plurality of first rotating members configured to rotate and distanced from one another inside the case; a second rotating member configured to rotate and provided between the first rotating members; a belt member mounted to the first rotating members and the second rotating member; and a tension adjuster located between the second rotating members and the first rotating member, and configured to support the belt member at its lower part so that the tension of the belt is adjusted.

13 Claims, 6 Drawing Sheets

(a)

(b)

CATERPILLAR FOR CABLE MOBILE ROBOT AND CABLE MOBILE ROBOT USING THE SAME

BACKGROUND

1. Field

The following description relates to a caterpillar for a cable mobile robot and a cable mobile robot using the same, and more particularly, to a caterpillar for a cable mobile robot wherein the contact area between the caterpillar and a cable is increased so that the cable can be moved more easily, and a cable mobile robot using the same.

2. Description of Related Art

A steel wire rope is an intensive steel wire cable that is made by twisting together several strands of wire each of which is made by twisting together several threads of thinner wires.

These types of ropes are used in suspension bridges where main cables are supported by towers and anchorages, and a stiffening girder is supported by suspenders that are suspended from the cables. In other words, a suspension bridge is built by hanging intensive steep wire ropes over two towers like clotheslines and then suspending a bridge from the ropes.

Steel wire ropes are also used for supporting elevators that are transportation means in apartments and high buildings.

As such, steel wire ropes are used in objects related to daily lives of humans and thus need to be examined on a regular basis. However, it may be difficult to put in workers to where the steel wire ropes are installed, which is a problem.

In order to resolve this problem, much research is being conducted on robots capable of moving along a steel wire rope.

However, since a cable such as a steel wire rope is made by twisting several strands of wires as aforementioned, when using a wheel for motion, the wheel would have to move along valleys and ridges formed by the steel wire rope, and thus it may be difficult to make a smooth movement, which is a problem.

SUMMARY

Therefore, a purpose of the various embodiments of the present invention is to resolve the aforementioned problems of related art, more particularly, to provide a caterpillar for cable mobile robot wherein the contact area between the caterpillar and a cable is increased allowing the caterpillar to move along the cable easily without being affected by valleys and ridges formed on the cable, and a cable mobile robot using the same.

Another purpose of the various embodiments of the present invention is to provide a belt member made of rubber to improve the frictional force against the cable so that the caterpillar can easily move along the cable.

Another purpose of the various embodiments of the present invention is to provide a panel member made of an ultra high molecular weight polyethylene resin to support the belt member, thereby preventing the frictional force against the belt member and maintaining the contacting state between the cable and the belt member regardless of flexure of the cable.

Another purpose of the various embodiments of the present invention is to provide a pair of tension adjusters of which only a second tension adjuster needs to be adjusted to easily adjust the tension of the belt member.

Another purpose of the various embodiments of the present invention is to provide the belt member with concaves-convexes on its inner surface, the concaves-convexes interlocked with a rotating member, thereby preventing the belt member from ticking over on the cable.

Another purpose of the various embodiments of the present invention is to provide a plurality of caterpillars contacting the outer circumference of a cable, so that the caterpillars can move along the cable easily regardless of flexure of the cable.

Another purpose of the various embodiments of the present invention is to provide a distance adjuster configured to adjust its distance from the main body, so that the contact with a cable can be maintained even when the diameter of the cable changes due to the environment or state of use.

According to an embodiment of the present invention, there is provided a caterpillar for cable mobile robot, the caterpillar including a case; a plurality of first rotating members configured to rotate and distanced from one another inside the case; a second rotating member configured to rotate and provided between the first rotating members; a belt member mounted to the first rotating members and the second rotating member; and a tension adjuster located between the second rotating members and the first rotating member, and configured to support the belt member at its lower part so that the tension of the belt is adjusted.

In the embodiment, a part of the second rotating member may protrude outside a virtual plane that meets an outer surface of the first rotating members.

In the embodiment, the tension adjuster may be provided below the virtual plane.

In the embodiment, the tension adjuster may include one pair of tension adjusters arranged such that they move towards or away from each other, and move towards each other, decreasing the tension of the belt member, or move away from each other, increasing the tension of the belt member.

In the embodiment, the tension adjuster may include a first tension adjuster of which the location is immobilized, and a second tension adjuster provided such that it can move towards or away from the first tension adjuster along a longitudinal direction of the case.

In the embodiment, the caterpillar may further include a panel member provided inside the case such that it supports the belt member while contacting an inner surface of the belt member; and a support member provided on an opposite surface of a surface that contacts a cable so that the location of the panel member is immobilized.

In the embodiment, the panel member may be made of a UHMWPE (Ultra High Molecular Polyethylene) resin.

In the embodiment, the belt member may be made of rubber.

In the embodiment, the belt member may have concaves-convexes formed on its inner surface, and at least one of the first rotating member and second rotating member may be a timing pulley configured to interlock with the concaves-convexes of the belt member.

According to another embodiment of the present invention, there is provided a cable mobile robot moving along a cable, the robot including a main body provided outside the cable; caterpillars for cable mobile robot according to any one of claims 1 to 7 provided along a longitudinal direction of the cable and along an outer circumference of the cable such that they are distanced from one another; and a power unit configured to transmit driving force to the caterpillar for cable mobile robot.

In the embodiment, the caterpillars for cable mobile robot may be distanced from one another along the outer circumference of the cable by a same angle.

In the embodiment, two caterpillars for cable mobile robot may be distanced from each other along the longitudinal direction of the cable.

In the embodiment, the robot may further include, between the caterpillar for cable mobile robot and the main body, a distance adjuster configured to adjust the distance between the caterpillar for cable mobile robot and the main body so that the caterpillar for cable mobile robot maintains a state of contacting the cable.

Various aforementioned embodiments of the present invention have an effect of enabling the caterpillar to move along the cable easily since the contact area between the caterpillar and the cable is increased.

Furthermore, there is also an effect of adjusting the tension occurring on the belt member using the tension adjuster since the caterpillar track is variable, thereby maintaining the contacting state between the caterpillar and cable.

Furthermore, there is also an effect of preventing the belt member from being deformed as the surface that contacts the cable is supported by the panel member.

Furthermore, there is also an effect of reducing the frictional force against the belt member while supporting the belt member at the same time since the panel member is made of an ultra high molecular weight polyethylene resin.

Furthermore, there is also an effect of improving the frictional force between the belt member and cable since the belt member is made of rubber.

Furthermore, there is also an effect of easily interlocking the rotating members since concaves-convexes are formed on the inner surface of the belt member and the rotating members are provided as timing pulleys.

Furthermore, there is also an effect of improving retention of contact with the cable by adjusting at least one of the number and arrangement of the caterpillars for cable mobile robot.

Furthermore, there is also an effect of easy adaptation even when the diameter of the cable is changed simply by adjusting the distance between the caterpillars for cable mobile robot and the main body using the distance adjuster.

Figure 1:
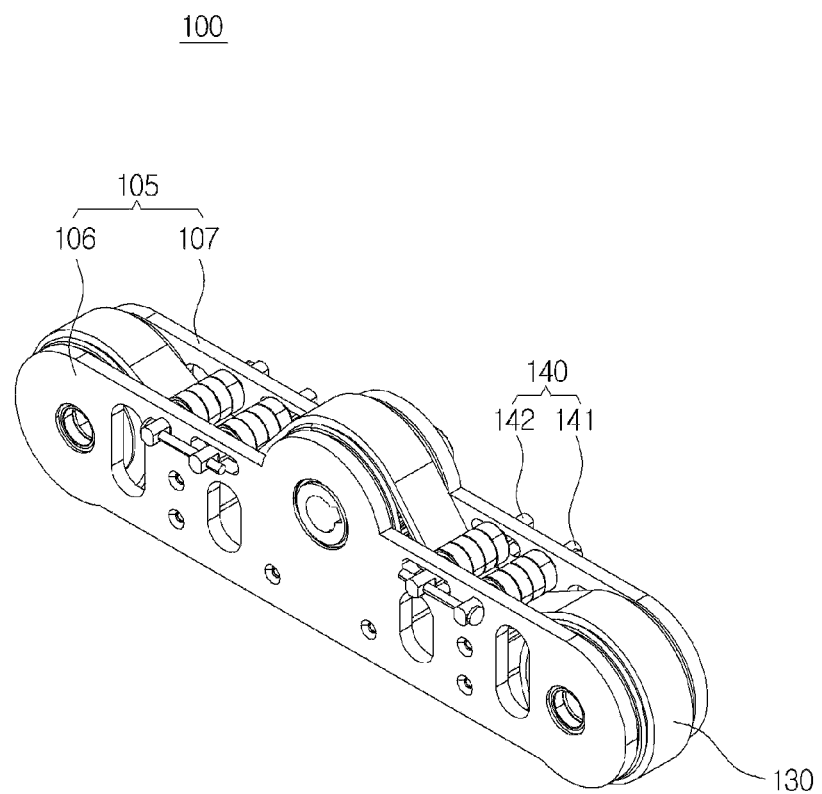
FIG. 1 is a perspective view schematically illustrating a caterpillar for cable mobile robot according to a first embodiment of the present invention.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Hereinbelow, a caterpillar for cable mobile robot according to a first embodiment of the present invention 100 will be explained in detail with reference to the drawings attached.

Figure 2:
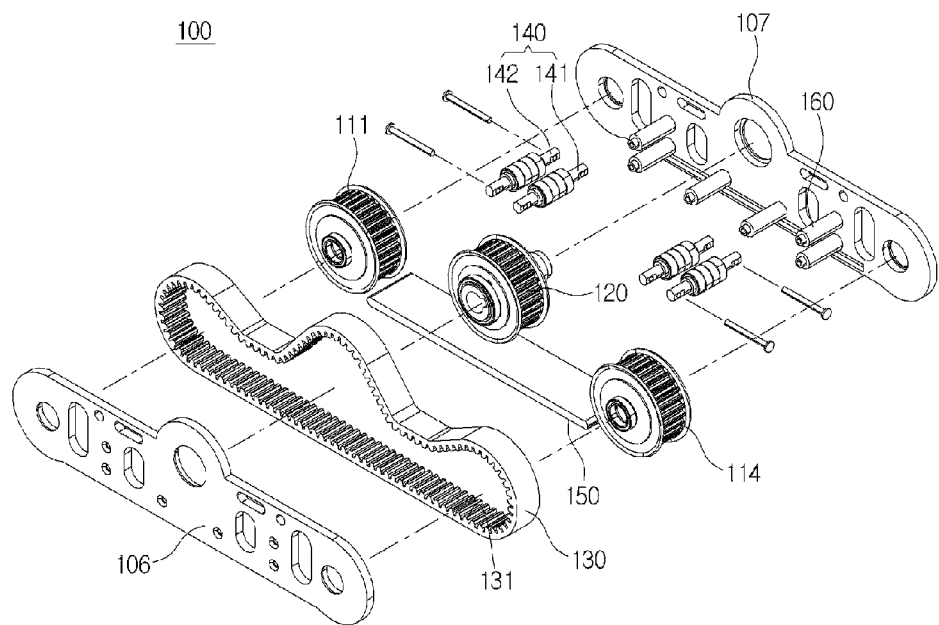
FIG. 2 is an exploded perspective view schematically illustrating the caterpillar for cable mobile robot of FIG. 1.
Figure 3:
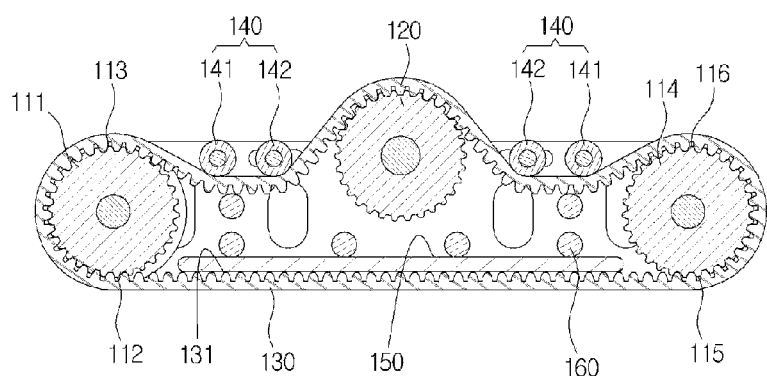
FIG. 3 is a cross-sectional view schematically illustrating the caterpillar for cable mobile robot of FIG. 1.
Figure 4:
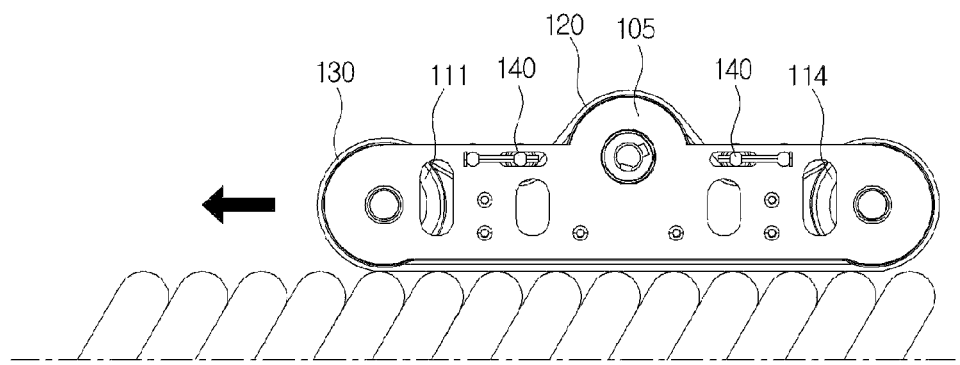
FIG. 4 is a front view schematically illustrating operations of a tension adjuster in the caterpillar for cable mobile robot of FIG. 1.

FIG. 1 is a perspective view schematically illustrating a caterpillar for cable mobile robot according to a first embodiment of the present invention; FIG. 2 is an exploded perspective view schematically illustrating the caterpillar for cable mobile robot of FIG. 1; FIG. 3 is a cross-sectional view schematically illustrating the caterpillar for cable mobile robot of FIG. 1; and FIG. 4 is a front view schematically illustrating operations of a tension adjuster in the caterpillar for cable mobile robot of FIG. 1.

Referring to FIGS. 1 to 4, the caterpillar for cable mobile robot according to the first embodiment of the present invention 100 is configured to easily move along a cable such as a wire rope where valleys and ridges are repeatedly formed along a longitudinal direction, and the caterpillar for cable mobile robot 100 includes a case 105, first rotating member 110, second rotating member 120, belt member 130, tension adjuster 140, panel member 150, and support member 160.

The case 105 plays the function of a main frame for the present embodiment. It is configured to accommodate therein the first rotating member 110, second rotating member 120, belt member 130, tension adjuster 140, panel member 150, and support member 160 that will be explained hereinbelow.

The case 105 of the caterpillar for cable mobile robot according to the first embodiment of the present invention 100 consists of a front part 106 and a rear part 107 that are spaced by as much as, including but not limited to, the width of the first rotating member 110 or second rotating member 120 that will be explained hereinbelow.

First rotating members 110 may be provided inside the case 105 such that they are spaced from each other, and such that they are rotated by the belt member 130 in an interlocked manner with the second rotating member 120.

In the caterpillar for cable mobile robot according to the first embodiment of the present invention 100, two first rotating members 110 configured as timing pulleys of the same size are provided at each end of the case 105, respectively. That is, each of the two first rotating members 110 is provided at a rightmost end 111 and at a leftmost end 114 of the case 105, respectively, Here, a virtual plane is formed by the two rotating members 110 provided at the rightmost end 111 and at the leftmost end 114 of the case 105, and such a virtual plane includes a virtual line connecting an uppermost point 113 of the first rotating member at the leftmost end 111 with an uppermost point 116 of the first rotating member at the rightmost end 114.

The caterpillar for cable mobile robot according to the first embodiment of the present invention 100 may be embodied based on, including but without limitation, the arrangements, number, and size disclosed herein. Thus, at least one of the arrangement, number and size of the caterpillar for cable mobile robot may be changed depending on the state of use.

The second rotating member 120 is provided between the first rotating members 110, such that its upper part protrudes upwards of the virtual plane, and thus a portion of the second rotating member 120 protrudes upwards the virtual plane.

In the caterpillar for cable mobile robot according to the first embodiment of the present invention 100, the second rotating member 120 is embodied as, including but without limitation, a timing pulley.

The belt member 130 is mounted onto the first rotating member 110 and the second rotating member 120. The belt member 130 rotates forming a caterpillar track, thus rotating the first rotating member 110 and second rotating member 120 in an interlocked manner.

In the caterpillar for cable mobile robot according to the first embodiment of the present invention 100, the belt member 130 is provided with concaves-convexes on its inner surface, and these convexes are interlocked with the first rotating member 110 and the second rotating member 120 such that it rotates the first rotating member 110 and the second rotating member 120 by, including but without limitation, an interlocked manner.

Furthermore, the belt member 130 may be made of, including but without limitation, rubber so as to easily move along the cable, increasing the frictional force against the cable.

The tension adjuster 140 is disposed between the first rotating member 110 and the second rotating member 120, and supports the belt member 130 at its lower part, thus adjusting the tension of the belt member 130.

In the caterpillar for cable mobile robot according to the first embodiment of the present invention 100, the tension adjuster 140 is provided below the virtual plane, and thus the actual caterpillar track at the location of the tension adjuster 140 protrudes downwards.

Furthermore, the tension adjuster 140 consists of a first tension adjuster 141 that is static, and a second tension adjuster 142 that is movable towards or away from the first tension adjuster 142 along a longitudinal reaction of the case 105, the first tension adjuster 141 and the second tension adjuster 142 being a pair. By adjusting the distance between a pair of tension adjusters 140, it is possible to adjust the size of tension occurring on the belt member 130.

Herein, the second tension adjuster 142 is disposed adjacent to the second rotating member 120, and thus by adjusting the second tension adjuster 142, it is possible to adjust the distance between the pair of tension adjusters 140 and also the distance from the second rotating member 120 at the same time, thereby efficiently adjusting the tension occurring on the belt member 130.

Furthermore, the tension adjuster 140 may be provided at both sides of the second rotating member 120, thus widening the scope of adjusting tension, but without limitation thereto.

That is, when the distance between a pair of tension adjusters 140 decreases, the size of the tension occurring on the belt member 130 decreases, and when the distance between the pair of tension adjusters 140 increases, the size of the tension occurring on the belt member 130 increases. Therefore, if the belt member is deformed such as by tension or compression due to environment changes, it is possible to revise the belt member 130 using the tension adjuster 140, thus maintaining the contact retention force of the belt member 130 with the cable.

However, the aforementioned explanation on the arrangement and operation methods of the tension adjuster 140 in the caterpillar for cable mobile robot 110 according to the first embodiment of the present invention is merely an example for embodiment thereof, without limitation thereto.

Meanwhile, the caterpillar track protrudes upwards at the location of the second rotating member 120 but protrudes downwards at the location of the tension adjuster 140, thereby forming a curve. Accordingly, the length of the track is longer than when the caterpillar track is not curved. Furthermore, it is possible to change the length of the caterpillar track by adjusting the distance between the pair of tension adjusters 140.

To explain this from the perspective of the tension occurring on the belt member 130, a curve is formed on the caterpillar track by the second rotating member 120 and the tension adjuster 140, and thus the tension occurring on the belt member 130 is greater than on the virtual plane. Furthermore, it is possible to adjust the size of the tension occurring on the belt member 130 by adjusting the tension adjuster 140.

The panel member 150 is provided inside the case 105 such that it contacts the opposite surface of the surface that contacts the cable, thus supporting the belt member 130. Since a cable tends to have repeated curves, in order to move along such a cable without any deformation of the belt member 130, the part of the belt member 130 that contacts the cable must be supported.

By such a panel member 150, while moving along the cable, the belt member 130 contacts the panel member 150 and receives a surface pressure, and thus the belt member 130 can move along the cable without being deformed. Herein, the length of the panel member 150 may desirably be, including but without limitation, greater than at least the cycle of repetition of a curve on the cable.

In the caterpillar for cable mobile robot according to the first embodiment of the present invention 100, the panel member 150 may be made of, including but not limited to, UHMWPE (Ultra High Molecular Polyethylene: product name is GUR sheet) in order to minimize occurrence of frictional force on the contact surface of the belt member 130 with a self-lubricative material.

The support member 160 is provided on a panel member 150 surface opposite to the panel member 150 surface contacting the belt member 130 in order to immobilize the location of the panel member 150 inside the case 105.

In the caterpillar for cable mobile robot according to the first embodiment of the present invention 100, a plurality of support members 160 are embodied as a plurality of rods contacting the front part and rear part of the case 105 and thus being immobilized, while also contacting the panel member 150 at their lower parts, and thus immobilizing the location of the panel member 150.

Therefore, the support member 160 may desirably be immobilized in, including but without limitation, the case 105.

As for the order of arranging the belt member 130, panel member 150, and support member 160, the cable is arranged first, followed by the belt member 130, followed by the panel member 150, and followed by the support member 160. When the caterpillar for cable mobile robot 100 receives a surface pressure at a ridge point of the cable while moving along the cable, the panel member 150 supports the caterpillar 100, and the support member 160 supports the panel member 150.

Hereinafter, operations of the aforementioned caterpillar for cable mobile robot according to the first embodiment of the present invention 100 and the cable mobile robot using the same will be explained in detail.

First of all, the first rotating member 110 or the second rotating member 120 receives power from an external power source and rotates. In the caterpillar for cable mobile robot according to the first embodiment of the present invention 100, the second rotating member 120 receives power, but without limitation thereto.

When the second rotating member 120 rotates counter-clockwise, the belt member 130 rotates forming a caterpillar track that rotates along the tension adjuster 140 and the leftmost first rotating member 111, moves along the cable and the panel member 150, passes the rightmost first rotating member 114 and the tension adjuster 140, and comes back to the second rotating member 120.

Herein, the caterpillar track protrudes upwards by the second rotating member 120, protrudes downwards by the tension adjuster 140, protrudes upwards again by the first rotating member 110, thus forming a caterpillar track of three peaks.

Figure 5:
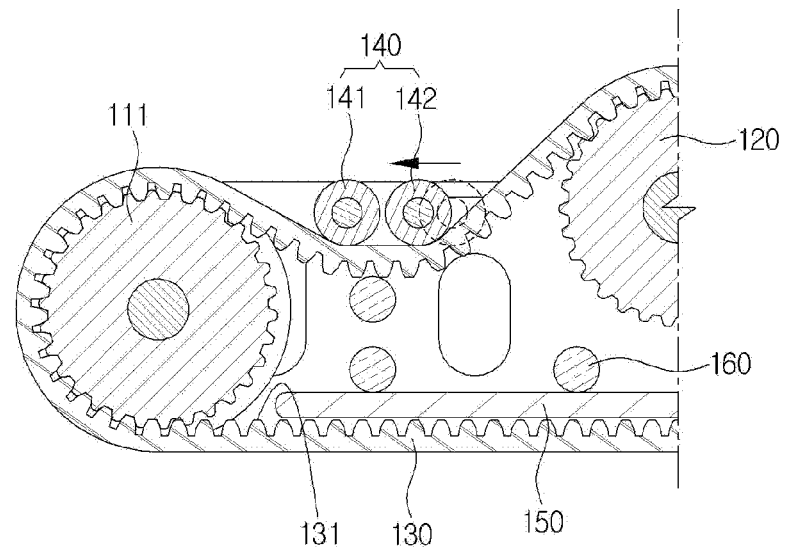
Figure 5:
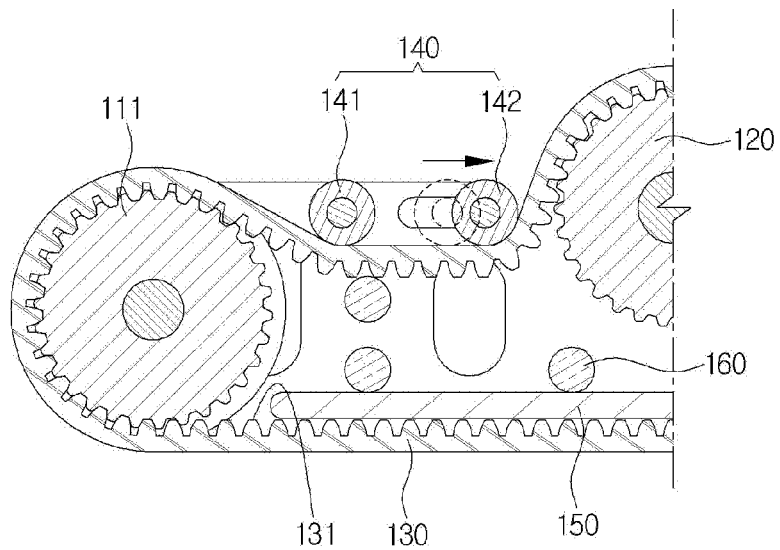

FIG. 5 is a cross-sectional view schematically illustrating operations of the tension adjuster in the caterpillar for cable mobile robot of FIG. 1.

Referring to FIG. 5, regarding the method of adjusting the tension occurring on the belt member 130 by the tension adjuster 140, when the second tension adjuster 142 is moved towards the first tension adjuster 141 to decrease the distance between the pair of tension adjusters 140, the length of the actual caterpillar track, that is the path along which the belt member 130 rotates decreases, thus decreasing the tensioned length of the belt member 130 and the tension occurring on the belt member 130.

In other words, the length the portion of the caterpillar track that connects the uppermost point 113 of the leftmost first rotating member 111 and the uppermost point 116 of the rightmost first rotating member 114 decreases due to the decrease of distance between the pair of tension adjusters 140, thereby also decreasing the tension occurring on the belt member 130.

Herein, circumstances where the tension occurring on the belt member 130 may decrease include, but not limited to, when the temperature decreases.

On the other hand, when the second tension adjuster 142 is moved away from the first tension adjuster 141 to increase the distance between the pair of tension adjusters 140, the length of the actual caterpillar track, that is the path along which the belt member 130 rotates increases, thus increasing the tensioned length of the belt member 130 and the tension occurring on the belt member 130.

In other words, the length the portion of the caterpillar track that connects the uppermost point 113 of the leftmost first rotating member 111 and the uppermost point 116 of the rightmost first rotating member 114 increases due to the increase of distance between the pair of tension adjusters 140, thereby also increasing the tension occurring on the belt member 130.

Herein, circumstances where the tension occurring on the belt member 130 may increase include, but not limited to, when the temperature increases.

Hereinafter, a cable mobile robot according to a second embodiment of the present invention 200 will be explained.

Figure 6:
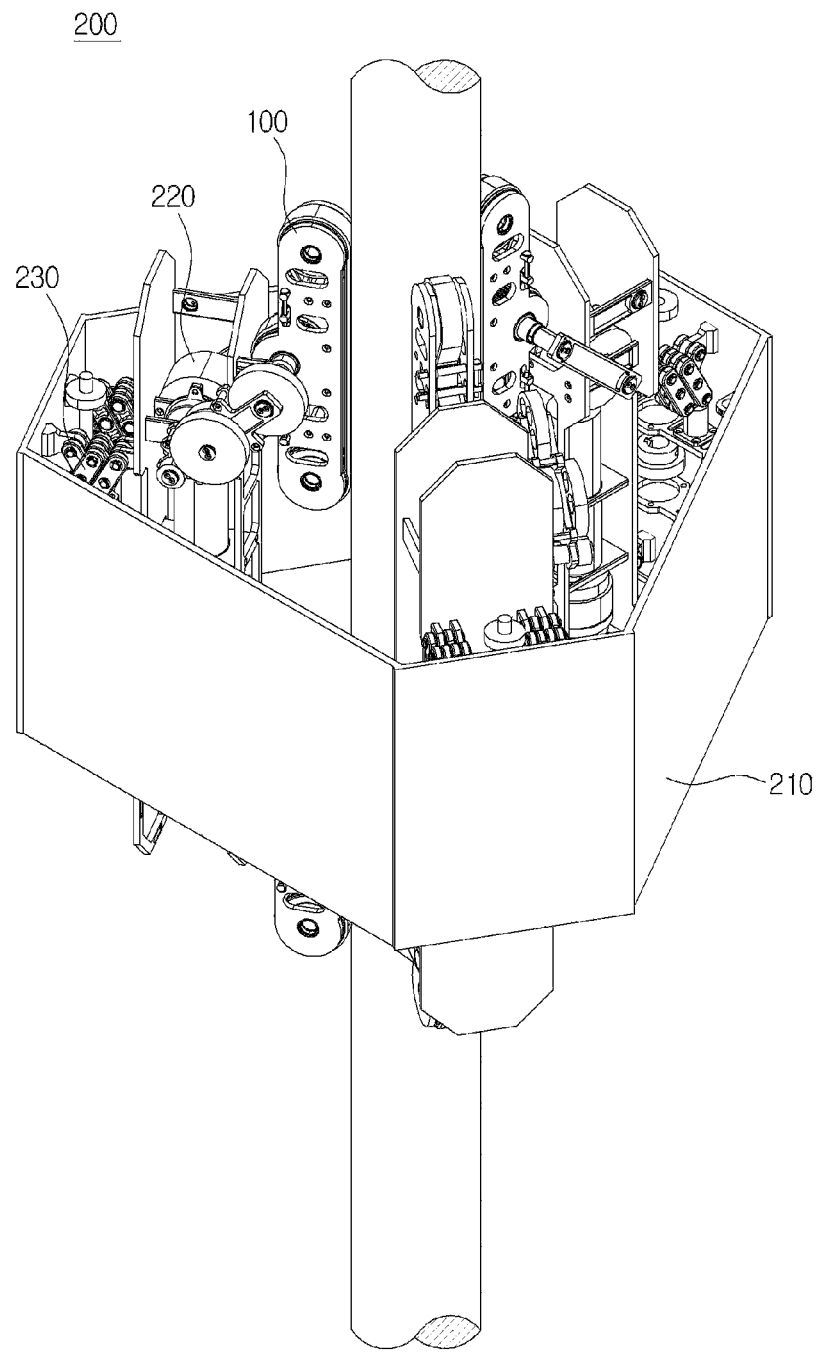
FIG. 6 is a perspective view schematically illustrating a cable mobile robot according to a second embodiment of the present invention.
Figure 7:
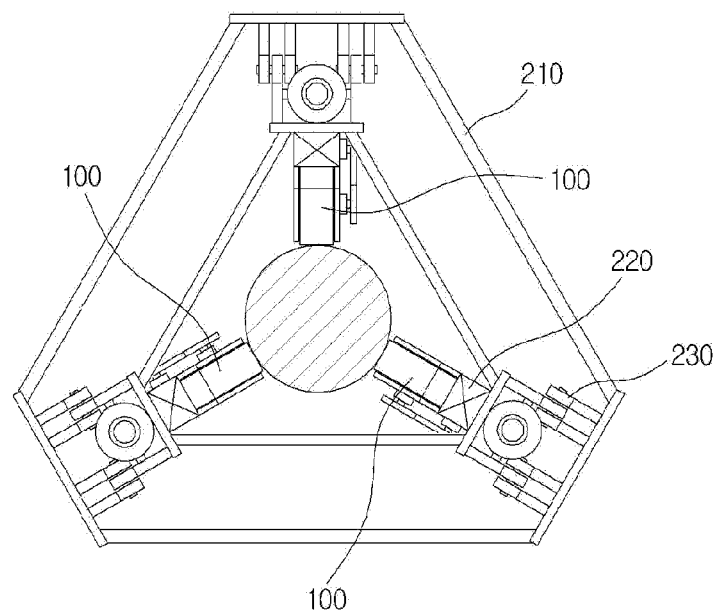
FIG. 7 is a top view schematically illustrating the cable mobile robot of FIG. 6.

FIG. 6 is a perspective view schematically illustrating a cable mobile robot according to a second embodiment of the present invention; FIG. 7 is a top view schematically illustrating the cable mobile robot of FIG. 6; and FIG. 8 is a front view schematically illustrating the cable mobile robot of FIG. 6.

Figure 8:
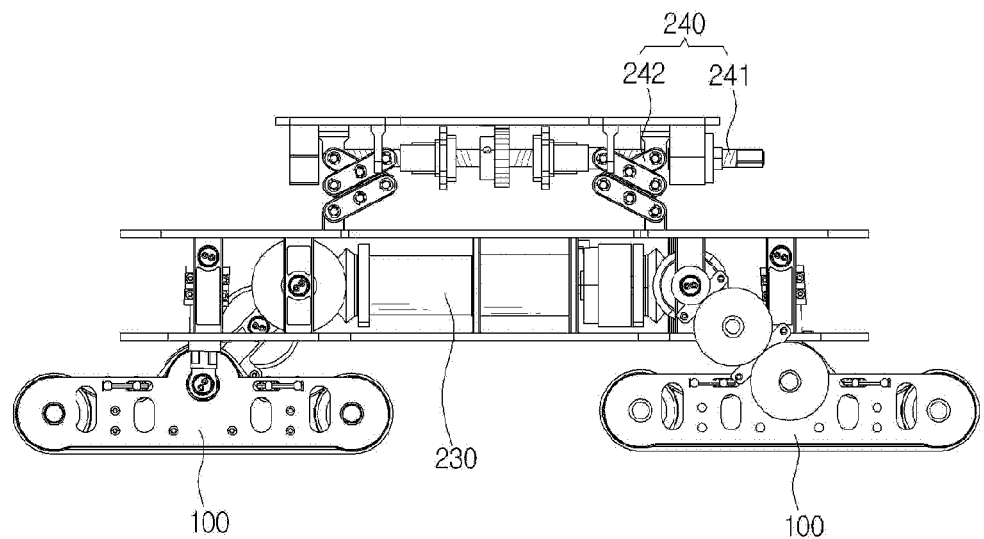
FIG. 8 is a front view schematically illustrating the cable mobile robot of FIG. 6.

Referring to FIGS. 6 to 8, the cable mobile robot according to the second embodiment of the present invention 200 is capable of moving a cable using the caterpillar for cable mobile robot 100 aforementioned. The cable mobile robot 200 includes a caterpillar for cable mobile robot 100, main body 210, power unit 220, and distance adjuster 230.

The configuration of the caterpillar for cable mobile robot 100 is the same as that explained with reference to the first embodiment of the present invention, and thus detailed explanation is omitted.

Referring to FIG. 6 or FIG. 7, three pairs of caterpillars for cable mobile robot 100, i.e. a total of six caterpillars for cable mobile robot 100, are arranged along the outer circumference of the cable, the three pairs distanced from one another.

That is, each of the three pairs of caterpillars for cable mobile robot 100 is distanced from another pair by desirably 120° along the outer circumference of the cable, wherein two caterpillars 100 of each pair are arranged along a longitudinal direction of the cable.

Herein, the three pairs of caterpillars for cable mobile robot 100 being arranged along the outer circumference of the cable enable the cable mobile robot 200 to move stably among the cable while maintaining the state of contacting the cable.

However, there is no limitation to such number or arrangement of the caterpillar for cable mobile robot 100. The number or arrangement of the caterpillar for cable mobile robot 100 may be set differently depending on the size or usage state of the cable mobile robot.

The main body 210 plays the function of a main frame of the cable mobile robot. It is provided outside the cable, and is distanced from the cable in a radial direction, thus creating a space where the caterpillar for cable mobile robot 100 can be installed between the cable and the main body 210.

The power unit 220 provides power to the caterpillar for cable mobile robot so that the cable mobile robot can move along the cable. In the cable mobile robot according to the second embodiment of the present invention 200, power is provided to the second rotating member 120, but there is no limitation thereto.

Herein, each of the caterpillars for cable mobile robot 100 may be provided with its individual power unit 220 so that power can be provided individually to each caterpillar for cable mobile robot 100, but there is no limitation thereto. Therefore, it is possible to provide a power unit 220 to every caterpillar for cable mobile robot 100 so as to provide power individually to each caterpillar for cable mobile robot 100; or provide a power unit 220 to each pair of caterpillars for cable mobile robot 100 to provide power to each pair of caterpillars for cable mobile robot 100 at the same time so that each pair of caterpillars for cable mobile robot 100 perform the same rotation; or provide a power unit to only one of each pair of the caterpillars for cable mobile robot 100 so that the other one of the pair is rotated manually; or provide only one power unit 220 regardless of the number of caterpillars for cable mobile robot 100, but there is no limitation thereto.

The distance adjuster 230 is arranged between the main body 210 and the caterpillar for cable mobile robot 100. It is configured to adjust the distance between the main body 210 and caterpillar for cable mobile robot 100 so that the caterpillar for cable mobile robot 110 and the cable maintain their contacting state.

In the cable mobile robot according to the second embodiment of the present invention 200, the distance adjuster 230 includes a ball screw 241 and pantograph 242. The distance adjuster 240 adjusts the distance between the caterpillar for cable mobile robot 100 and the main body 210 by rotating the ball screw 241, thus extending or contracting the pantograph 242 in a gravity direction 242.

However, there is no limitation to such a configuration, but any configuration may be used as long as it adjusts the distance between the caterpillar for cable mobile robot 100 and main body 210.

Hereinbelow, there will be explained operations of the aforementioned caterpillar for cable mobile robot and the cable mobile robot using the same according to a second embodiment 200.

Operations of the cable mobile robot 200 moving along a cable according to the second embodiment of the present invention are the same as the operations of the caterpillar for cable mobile robot 100 moving along a cable according to the first embodiment of the present invention, and thus detailed explanation is omitted.

However, unlike in the caterpillar for cable mobile robot according to the first embodiment of the present invention 100 where only one caterpillar moves along the cable, when the cable mobile robot according to the second embodiment 200 moves along a cable, stability is required. Thus, in the second embodiment, three pairs of caterpillars for cable mobile robot 100 are arranged such that each pair is distanced from another pair along the outer circumference of the cable, and such that two caterpillars 100 of each pair are arranged along a longitudinal direction of the cable. Accordingly, the cable mobile robot 200 is configured as if it wraps around the cable, and thus the cable mobile robot 200 can move along the cable while maintaining the state of contacting the cable.

Meanwhile, regarding the cable mobile robot 200 maintaining the state of contacting the cable using the distance adjuster 240, connecting members are arranged to face each other and such that they can either move towards or away from each other as the ball screw 241 rotates from the center of the ball screw 241. They are connected to an end of the pantography 242, and thus when the ball screw 241 rotates and moves the connecting members towards each other, the end of the pantography 242 moves towards the center of the ball screw 241, thereby contracting the pantography 242 and lowering the overall height. On the contrary, when the connecting members move away from each other as the ball screw 241 rotates, the end of the pantography 242 moves away from the center of the ball screw 241, thereby extending the pantography 242 and lowering the overall height.

Based on the aforementioned, in areas where the cable has different diameters, the distance between the caterpillar for cable mobile robot 100 and the main body 220 can be adjusted using the distance adjuster 240, allowing the caterpillar to proceed along such areas.

A number of examples have been described above. Nevertheless, it will be understood that various modifications may be made. For example, suitable results may be achieved if the described techniques are performed in a different order and/or if components in a described system, architecture, device, or circuit are combined in a different matter and/or replaced or supplemented by other components or their equivalents. Accordingly, other implementations are within the scope of the following claims.

REFERENCE NUMERALS

100: CATERPILLAR FOR CABLE MOBILE ROBOT
105: CASE
110: FIRST ROTATING MEMBER
120: SECOND ROTATING MEMBER
130: BELT MEMBER
140: TENSION ADJUSTER
150: PANEL MEMBER
160: SUPPORT MEMBER
200: CABLE MOBILE ROBOT
210: MAIN BODY
220: POWER UNIT
230: DISTANCE ADJUSTER

The invention claimed is:

1. A caterpillar for a cable mobile robot comprising:
a case;
a plurality of first rotating members configured to rotate and distanced from one another inside the case;
a second rotating member configured to rotate and located between the first rotating members;
a belt member mounted to the first rotating members and the second rotating member;
a tension adjuster located between the second rotating members and the first rotating members, the tension adjuster being configured to support the belt member at a lower part of the tension adjuster so that tension in the belt is adjusted; and
a panel member located inside the case, and the panel member is configured to support the belt member while contacting an inner surface of the belt member.

2. The caterpillar according to claim 1,
wherein a part of the second rotating member protrudes outside a virtual plane that meets an outer surface of the first rotating members.

3. The caterpillar according to claim 1,
wherein the tension adjuster is located below the virtual plane.

4. The caterpillar according to claim 1,
wherein the tension adjuster comprises one pair of tension adjusters arranged such that they move towards or away from each other;
the one pair of tension adjusters are configured to move towards each other to decrease the tension of the belt member; and
the one pair of tension adjusters are further configured to move away from each other to increase the tension of the belt member.

5. The caterpillar according to claim 4,
wherein the tension adjuster comprises a stationary first tension adjuster, and a second tension adjuster capable of moving towards or away from the first tension adjuster along a longitudinal direction of the case.

6. The caterpillar according to claim 1, further comprising
a support member located on an opposite surface of a surface that contacts a cable so that the location of the panel member is immobilized.

7. The caterpillar according to claim 6,
wherein the panel member is made of a Ultra High Molecular Polyethylene (UHMWPE) resin.

8. The caterpillar according to claim 1,
wherein the belt member is made of rubber.

9. The caterpillar according to claim 1,
wherein the belt member has notches formed on an inner surface, and
at least one of the first rotating members and second rotating member is a timing pulley configured to interlock with the notches of the belt member.

10. A cable mobile robot for moving along a cable, the robot comprising:
a main body configured to encircle the cable;
a plurality of caterpillars housed inside the main body, the plurality of caterpillars comprising:
a case;
a plurality of first rotating members configured to rotate and distanced from one another inside the case;
a second rotating member configured to rotate and located between the first rotating members;
belt member mounted to the first rotating members and the second rotating member;
a tension adjuster located between the second rotating member and the first rotating members, the tension adjuster being configured to support the belt member at a lower part of the tension adjuster so that tension in the belt is adjusted; and
a panel member located inside the case, and the panel member is configured to support the belt member while contacting an inner surface of the belt member, wherein the caterpillars are configured to be longitudinally oriented with respect to the cable and to contact an outer surface of the cable such that the caterpillars are angularly spaced from one another.

11. The cable mobile robot according to claim 10, wherein the caterpillars are further configured to be distanced from one another along the outer surface of the cable by a same angle.

12. The cable mobile robot according to claim 11, wherein two caterpillars are further configured to be distanced from each other along the longitudinal direction of the cable.

13. The cable mobile robot according to claim 10, further comprising a distance adjuster located between the caterpillar and the main body, the distance adjuster being configured to adjust the distance between the caterpillar and the main body so that the caterpillar maintains contact with the cable.

\* \* \* \* \*